May 31, 1955  T. C. COULTERS  2,709,454
HEATING AND VENTILATING DUCT
Filed Sept. 8, 1950
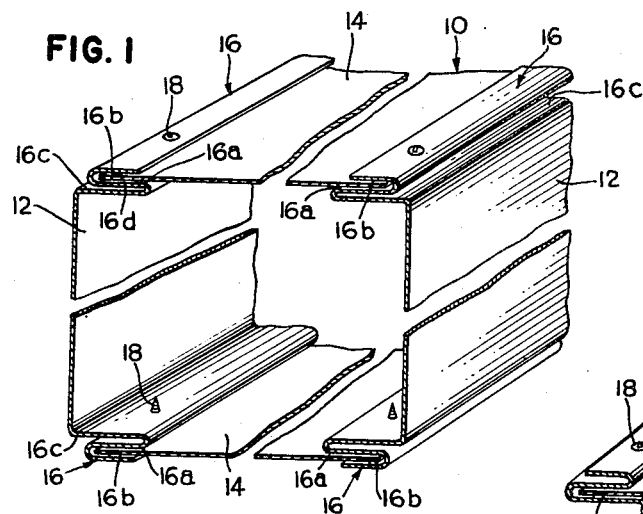
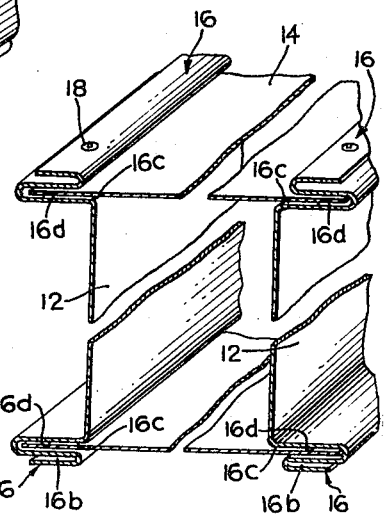
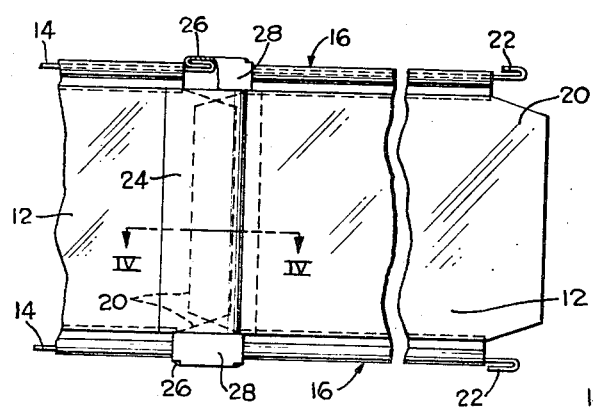
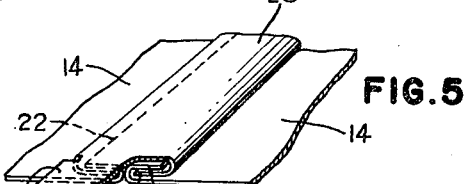
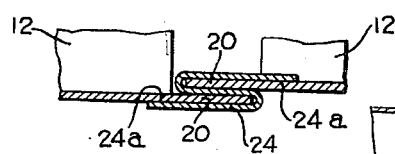
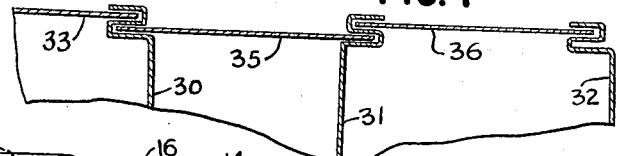
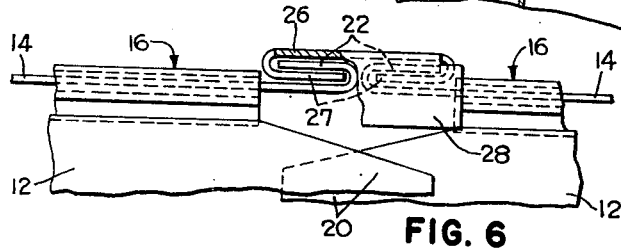
INVENTOR.
THOMAS C. COULTERS
BY
*Oldham & Oldham*
ATTORNEYS

United States Patent Office 2,709,454
Patented May 31, 1955

2,709,454

HEATING AND VENTILATING DUCT

Thomas C. Coulters, Cuyahoga Falls, Ohio

Application September 8, 1950, Serial No. 183,863

5 Claims. (Cl. 138—74)

This invention relates to improved heating and ventilating ducts and, more particularly, to a prefabricated, knocked-down duct which can be assembled at the time and place of installation.

It is the usual practice in the construction and installation of heating ducts and the like to fully form the ducts in the sheet metal shop and to thereafter install the fully formed ducts on location. This has necessitated a most careful measuring and estimating operation on location followed by shop fabrication. Then the fully formed ducts must be transported to the job and this is inefficient because, although the ducts are light in weight, they are very space-consuming. Once on the job, considerable cut and try is often required unless the measuring and estimating operation has been extremely well done. Additionally, any changes required may require return to the sheet metal shop.

It has been proposed to provide knocked-down duct sections of a plurality of selected types which can be assembled on the job to meet the duct requirements of any given installation, but such proposals have not met with commercial success, so far as I am aware, because of a number of reasons including complications of assembly, lack of adequate flexibility to meet construction requirements, expense, and lack of air tightness after assembly.

It is the general object of my invention to avoid and overcome the foregoing and other difficulties of and objections to prior art practices by the provision of a duct for air or other gases made from prefabricated sheet metal parts which may be easily assembled without special tools or equipment at the place of installation.

Another object of my invention is to provide a relatively inexpensive, leak-proof duct which can be constructed in a variety of shapes and sizes from preselected stock parts.

Another object of my invention is to provide a structure of the type described and made in cross-sectionally rectangular form for space-saving placement between joists and rafters.

Another object of my invention is the provision of a heating and ventilating duct which can be assembled from stock parts on location to meet any of a variety of requirements and in which stabbing of parts together during assembly is facilitated.

The aforesaid objects of the invention, and other objects which will become apparent as the description proceeds, are achieved by providing a duct comprising a plurality of units, each unit having a pair of channels comprising the sides, and a pair of flat sheet strips for the top and bottom thereof, a flattened S-shaped margin integrally formed along the longitudinal edges of the channels adapted to receive the longitudinal edges of the flat sheet strips, a loop along the transverse edges of the flat sheet strips, a connector or cleat for clipping the units together end to end and engaging the loops of said flat sheet strips forming the top and bottom of adjacent units, means for securing the connectors against lateral movement when in assembled position, the channels terminating in tongues, said tongues of adjacent units lying in overlapping relationship when the units are clipped together, and a flattened S-shaped connector engaging the overlapping tongues to further secure and completely seal the connection joints between adjacent units.

For a better understanding of the invention, reference should be had to the accompanying drawings, wherein:

Fig. 1 is a fragmentary sectional view in perspective of one embodiment of the invention showing the longitudinal joint construction forming a unit:

Fig. 2 is a view similar to Fig. 1 showing an alternative form of the assembled duct unit;

Fig. 3 is a fragmentary side elevationed view, partly in section, showing details of the joint construction between the channels of adjacent units;

Fig. 4 is an enlarged fragmentary sectional view taken substantially on line IV—IV of Fig. 3 showing the flattened S-shaped connector which joins in end-to-end relation the overlapping tongues of adjacent channels, all parts being shown of exaggerated thickness to allow for better illustration.

Fig. 5 is an enlarged fragmentary perspective view, partly in section, illustrating in the construction of the connector joining adjacent flat top and bottom walls of the duct in end-to-end relation;

Fig. 6 is an enlarged fragmentary side elevational view, partly in section, of the joint construction of Fig. 3 but with the S-shaped connector removed; and Fig. 7 is a fragmentary section through a modification of the invention.

With specific reference to the form of the invention illustrated in the drawings, the numeral 10 indicates generally a duct assembly or unit made of sheet metal or the like including side channels 12 and top and bottom sheet strips 14. The longitudinal edges of the channels 12 are constructed with a double reverse bend forming an integral flattened S-shaped margin shown generally at 16. In order to allow for clearer illustration in the drawings, the margins 16 have not been shown as flattened as they are in actual construction.

Assembly of the duct unit is effected by stabbing the opposing longitudinal edges of the top and bottom sheet strips 14 into the slots provided by the S-shaped margins 16 along the longitudinal edges of the channels 12. The units can be made in either of the two alternative forms shown in Figures 1 and 2, depending upon which loop of the S-shaped margin 16 is used in securing the channel 12 to the sheet strip member 14. Sheet metal screws 18 are used to secured the unit after assembly.

It is to be understood that the channels 12 and sheet strips 14 can be made up in a variety of lengths and widths whereby units can be made up of any desired length, width, and depth.

The use of double grooves as provided by the margins 16 allows two or more ducts to be positioned side by side with a common wall or walls if this be desired in any installation. The modification of the invention shown in Fig. 7 includes a plurality of channels 30, 31 and 32 each of which has a pair of S-shaped margins along a pair of opposed edges thereof. The grooves are open to opposite faces or sides of the channels and two pairs of channels are formed with the channel 31, the center channel, being used in each pair of channels so produced. Thus by engaging the sheet metal strips 33, 35 and 36, which the channels 30 through 32, as indicated, a plurality of ducts can be formed with a minimum of material. Three channels and two pairs of sheet metal strips make two complete ducts. The channels and duct construction as shown are in general of the same construction as that in the other figures of the drawing except that this shows how a plurality of ducts can be provided with use of minimum number of parts.

A duct of any desired length can be made by joining a number of units 10 together, as illustrated in Fig. 3. The ends of the channels 12 terminate in projecting tongues 20; the top and bottom sheet strips 14 terminate on each end in a reverse-fold loop 22. When two enclosure units 10 are brought in end-to-end relationship to form a continuous duct, the tongues 20 of adjacent channels 12 are in overlapping relationship as shown in Fig. 4, while the folded loops 22 of adjacent top and bottom sheet strips 14 are substantially in abutment.

To insure a rigid and sealed joint between adjacent overlapping tongues 20 of channels 12, the tongues are stabbed into a flattened S-shaped connector 24, as best shown in Fig. 4. The ends of the strips 14 of adjacent units 10 are secured in end-to-end relationship by cleats or connectors 26, as best seen in Figures 5 and 6. The connectors 26 are formed with inwardly turned edges 27 which engage the abutting loops 22 on the ends of strip 14. In order to secure the connectors 26 after they are slid into the assembled position, tabs 28 extending beyond and integrally formed with the ends of the connector 26 are bent down through 90° over the open ends of the loops 22.

An important feature of my invention is that all parts to be stabbed together, that is any flattened S-shaped connectors or margins, include a shelf in direct alignment with the groove into which the part is to be stabbed. Thus, having reference to Figures 1 and 2 and the margins 16, a shelf or shoulder 16$^a$ is provided in Fig. 1 on which the edge of the sheet metal strips 14 can rest to be aligned thereby to facilitate stabbing or moving the edges of the strips 14 into the grooves 16$^b$ of Fig. 1. Similarly, and as shown in Fig. 2, shelves 16$^c$ are provided for facilitating stabbing of the edges of strips 14 into grooves 16$^d$ of margins 16. Likewise, shelves 24$^a$ are provided on each edge of connectors 24 for facilitating stabbing tongues 20 into the grooves of the connector.

From the foregoing description, it will be seen that a number of enclosure units can be readily and inexpensively made up from pre-formed channels and flat sheet strips, which can then be joined and clipped securely in end-to-end relationship to make a continuous leak-proof duct for air or other gases.

While in accordance with the patent statutes, one best known embodiment of my invention has been illustrated, it is to be understood that I am not to be limited thereto or thereby, but that the scope of my invention is defined in the appended claims.

I claim:

1. A heating and ventilating duct unit including a pair of opposed sheet metal channels having flattened S-shaped margins, a pair of opposed flat sheet metal strips having their edges received in the margins of the channels, means locking the strip edges in the margins of the channels, the flattened S-shaped margins providing a pair of oppositely directed equal size grooves along each edge of the channel with one groove being open towards one face of the duct and the other groove open to the other duct face so that the channels can be turned to have either groove face inwardly of the duct, and a stabbing shelf associated with each oppositely directed groove in the channel margins.

2. A heating and ventilating duct unit including a pair of opposed sheet metal channels each having a pair of opposed flattened S-shaped margins, a pair of opposed flat sheet metal strips having their edges received in the margins of the channels, and means locking the strip edges in the margins of the channels, the flattened S-shaped margins providing oppositely directed grooves along each edge of the channel so that the channels can be turned to have either face inwardly of the duct for receiving the metal strips therein to provide different duct dimensions.

3. A heating and ventilating duct unit comprising at least three opposed sheet metal channels each having a pair of opposed flattened S-shaped margins providing a pair of equal size oppositely directed grooves along each edge of the channel and open to opposite faces of the channel, said channels providing at least two pairs of channels with a center channel being used in each of said pairs, and different pairs of opposed sheet metal strips individually engaged with individual grooves of and extending between each of said pairs of channels to form a duct from each of said pairs of channels whereby the center channel of the said three channels receives a sheet metal strip in each of the grooves therein, with the sheet metal strips engaging a pair of oppositely directed grooves extending in opposite directions from the said center channel.

4. A heating and ventilating duct unit, a sheet metal channel having a pair of flattened S-shaped opposed margins providing a pair of oppositely directed grooves along each edge of the channel, which grooves are open to opposite faces of the channel, and a different sheet metal strip engaged with the grooves of and extending in an opposite direction from the grooves in at least one margin of said channel for forming different ducts each including at least some of said channel.

5. In a duct unit as in claim 3, wherein at least four channels are provided and wherein two center channels are present and form parts of two ducts, at least three ducts being present in the unit, and wherein the sheet metal strips engaging the grooves in alternate ones of said channels are aligned.

References Cited in the file of this patent

UNITED STATES PATENTS

| | | |
|---|---|---|
| 760,216 | Laws | May 17, 1904 |
| 1,351,645 | Hamby | Aug. 31, 1920 |
| 1,356,022 | Smith | Oct. 19, 1920 |
| 1,451,043 | Le Compte | Apr. 10, 1923 |
| 2,126,499 | Petersen | Aug. 9, 1938 |
| 2,227,587 | Jones et al. | Jan. 7, 1941 |
| 2,302,565 | Milhone | Nov. 17, 1942 |
| 2,333,026 | McDonough | Oct. 26, 1943 |
| 2,389,468 | Terry | Nov. 20, 1945 |

FOREIGN PATENTS

| | | |
|---|---|---|
| 233,547 | Great Britain | May 14, 1925 |
| 456,189 | Germany | June 12, 1924 |